US007016268B2

(12) United States Patent
Yoshida et al.

(10) Patent No.: US 7,016,268 B2
(45) Date of Patent: Mar. 21, 2006

(54) OPTICAL REPRODUCING SYSTEM HAVING RESUME FUNCTION BASED ON RECORDING TIME OF EACH PROGRAM ON THE MEDIUM

(75) Inventors: Masao Yoshida, Saitama (JP); Takashi Sasaki, Saitama (JP); Shinichi Naohara, Saitama (JP); Yasuhisa Okamoto, Saitama (JP); Kazunori Matsuo, Saitama (JP)

(73) Assignee: Pioneer Corporation, Tokyo (JP)

( * ) Notice: Subject to any disclaimer, the term of this patent is extended or adjusted under 35 U.S.C. 154(b) by 312 days.

(21) Appl. No.: 10/441,184

(22) Filed: May 20, 2003

(65) Prior Publication Data
US 2003/0218942 A1 Nov. 27, 2003

(30) Foreign Application Priority Data
May 24, 2002 (JP) .......................... P2002-150404

(51) Int. Cl.
*G11B 21/08* (2006.01)

(52) U.S. Cl. ................................. 369/30.24; 369/30.36

(58) Field of Classification Search ...................... None
See application file for complete search history.

(56) References Cited

U.S. PATENT DOCUMENTS 4,706,233 A * 11/1987 d'Alayer de Costemore d'Arc ... 369/34.01
4,841,505 A * 6/1989 Aoyagi ..................... 369/30.12
5,122,999 A * 6/1992 Kimura et al. ............ 369/30.36
5,365,502 A * 11/1994 Misono ....................... 369/18
5,457,672 A * 10/1995 Shinada et al. ........... 369/53.37
5,463,601 A * 10/1995 Yanagisawa ............. 369/30.24
5,761,519 A * 6/1998 Wada et al. ................ 713/330
5,831,946 A * 11/1998 De Bie ..................... 369/30.36
5,974,008 A * 10/1999 Lee .......................... 369/30.36
6,188,650 B1 * 2/2001 Hamada et al. ........... 369/30.36
6,388,961 B1 * 5/2002 Ijichi ........................ 369/30.36
6,396,777 B1 * 5/2002 Thomas .................... 369/30.24
6,574,172 B1 * 6/2003 Hamada et al. ........... 369/30.36

FOREIGN PATENT DOCUMENTS

JP 4-37495 (A) 2/1992

* cited by examiner

*Primary Examiner*—Tan Dinh
(74) *Attorney, Agent, or Firm*—Sughrue Mion, PLLC

(57) ABSTRACT

A record medium playback apparatus includes a playback section and a playback control section. The playback control section is adapted to control a playback start position of the program information when the record medium playback apparatus is restarted after power thereof was turned off. The playback control section determines the playback start position of the program information using a first sequence when the record time of the whole program information corresponding to the playback position at the power off is less than a predetermined time. The playback control section determines the playback start position of the program information using a second sequence when the record time of the whole program information corresponding to the playback position at the power off is equal to or longer than the predetermined time.

5 Claims, 3 Drawing Sheets

OPTICAL REPRODUCING SYSTEM HAVING RESUME FUNCTION BASED ON RECORDING TIME OF EACH PROGRAM ON THE MEDIUM

The present disclosure relates to the subject matter contained in Japanese Patent Application No. 2002-150404 filed on May 24, 2002, which is incorporated herein by reference in its entirety.

BACKGROUND OF THE INVENTION

1. Field of the Invention

This invention relates to a playback apparatus and a playback method of a record medium such as a disk.

2. Description of the Related Art

A record medium playback apparatus for playing back program information such as music data, recorded on a record medium such as a disk in a related art starts playback simply at the playback position when the power of the playback apparatus is turned on. For example, if the power of the playback apparatus is turned off while program information recorded on a record medium is being played back, and is again turned on, the playback apparatus restarts playback of the program information at the playback position at which the pickup was positioned when the power was turned off.

Thus, condition called "playback with the beginning part skipped" that program information is played back as the beginning of the program information is skipped or condition called "playback with the last part remaining" that only the termination part of program information is played back occurs depending on the playback start position.

That is, playing back the program information is started with the skipped introduction part of the program information or if the program information ends with a fade-out, playing back the program information is started at the fade-out part; the event maybe offensive to the user.

To solve the problem, for example, as shown in JP-A-4-037495, whether the playback position at which the pickup is positioned when the power of a record medium playback apparatus was turned on is in the first or latter half of program information is determined and if the playback position is in the first half, playing back the program information is started at the beginning position; if the playback position is in the latter half, playing back is started at the beginning position of program information next to that program information.

The art described in JP-A-4-037495 can effectively eliminate the condition of "playback with the beginning part skipped" and the condition of "playback with the last part remaining," however, similar processing is performed regardless of the length of the record time of program information and therefore it is not always preferable method to playback for a user.

For example, as for program information with record time TTm being extremely long, as shown in FIG. 3, if the playback position at which the pickup was positioned when the power of the record medium playback apparatus was turned off is slightly leaning to the termination position (indicated by B in FIG. 3) from the half of the record time of the whole program information (indicated by A in FIG. 3), playing back is started at the beginning position of program information next to that program information.

In doing so, even when the remaining record time indicated by T2 in FIG. 3 is substantially long, the portion corresponding to T2 will be skipped. Therefore, it is not always preferable method to playback for a user.

SUMMARY OF THE INVENTION

It is therefore an object of the invention to provide a record medium playback apparatus and a record medium playback method for effectively determining the playback start position of program information when the record medium playback apparatus is started.

According to a first aspect of the invention, there is provided a record medium playback apparatus for playing back a record medium recording a plurality of pieces of program information and information including record time for each of the pieces of program information, the apparatus having: a playback section adapted to play back the program information; and a playback control section adapted to control a playback start position of the program information when the record medium playback apparatus is restarted after power thereof was turned off, wherein the playback control section determines the playback start position of the program information using a first sequence when the record time of the whole program information corresponding to the playback position at the power off is less than a predetermined time, and determines the playback start position of the program information using a second sequence when the record time of the whole program information corresponding to the playback position at the power off is equal to or longer than the predetermined time.

According to a second aspect of the invention, there is provided a record medium playback method for playing back a record medium recording a plurality of pieces of program information and information including record time for each of the pieces of program information, the method including: when a record medium playback apparatus is restarted after power thereof was turned off, comparing the record time of the whole program information corresponding to the playback position at the power off with a predetermined time; determining a playback start position of program information using a first sequence when the record time is less than the predetermined time; determining a playback start position of program information using a second sequence when the record time is equal to or longer than the predetermined time; and starting playing back of the program information at the determined playback start position.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, there are shown preferred embodiments of a record medium playback apparatus and a record medium playback method according to the invention.

In the embodiment, a record medium playback apparatus for playing back program information recorded on a optical disk will be discussed as an example.

Figure 1:
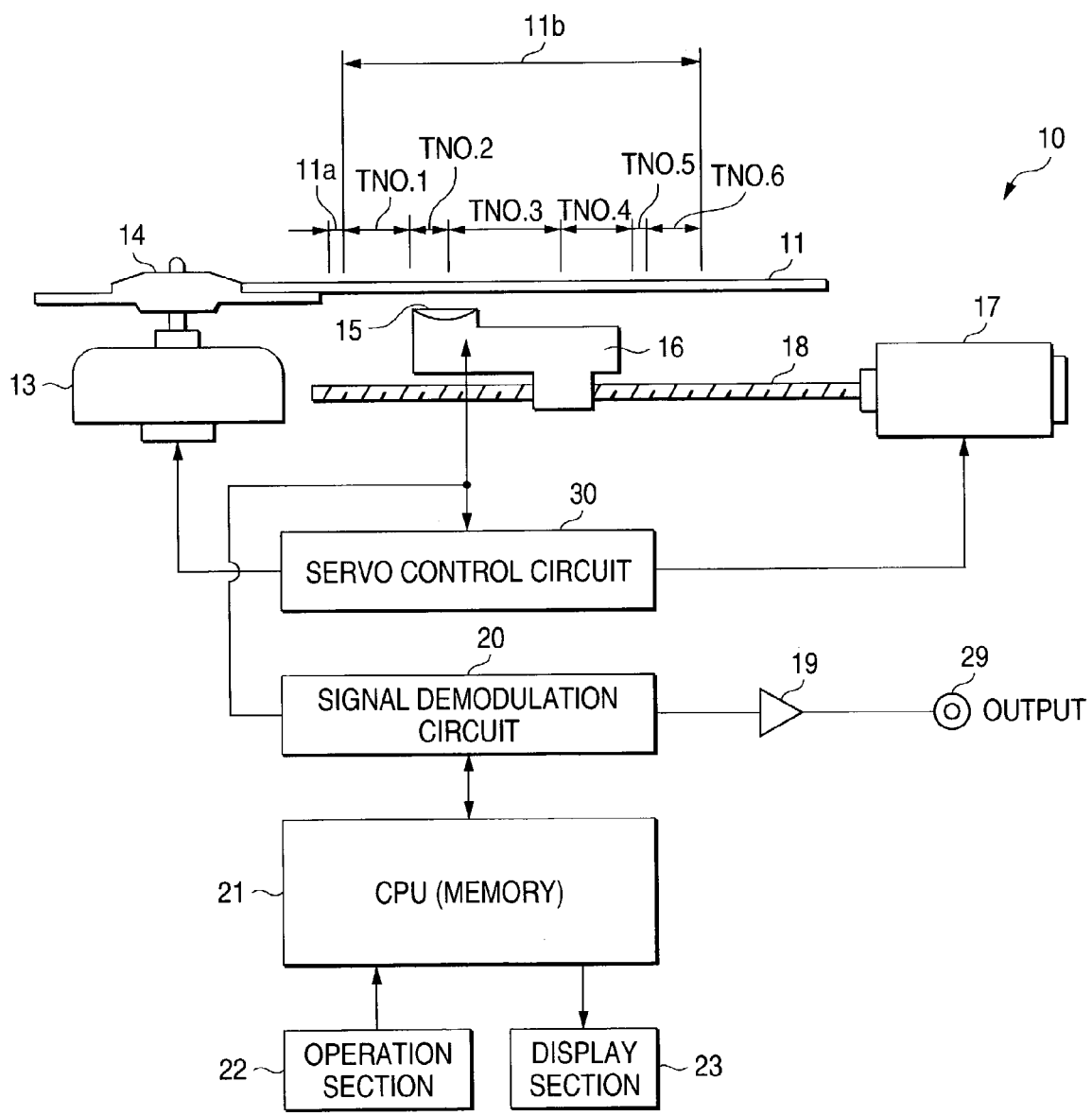
FIG. 1 is a diagram to show the configuration of an embodiment of a record medium playback apparatus according to the invention.

FIG. 1 is a diagram to show the configuration of an optical disk player 10 of a record medium playback apparatus. Six pieces of program information (track numbers TNO. 1 to TNO. 6) are recorded in a data area 11a of an optical disk 11 of a record medium with information such as track numbers and time codes (in hours/minutes/seconds format, for example).

Further, TOC (Table of Contents) information including the track numbers of the each pieces of program information, and time codes indicating the playback start and the playback end is recorded in a read-in area 11b at the inner radius of the optical disk 11 from the data area 11a.

The optical disk player 10 is provided with a turntable 14 on which the optical disk 11 is placed for rotation and a spindle motor 13 for rotating the turntable 14.

On the other hand, a pickup 15 for applying laser beam to the information record side of the optical disk 11 and reading program information, a feed screw mechanism 18 for allowing the pickup 15 to reciprocate in the radial direction of the optical disk 11, and a carriage motor 17 for rotating the feed screw mechanism 18 are provided below the optical disk 11 placed on the turntable 14.

The feed screw mechanism 18 is rotated in the positive negative direction by a driving force supplied from the carriage motor 17 for reciprocating the pickup 15 in the radial direction of the optical disk 11.

The optical disk player 10 is also provided with a servo control circuit 30 for controlling the rotation speed of the spindle motor 13 and the number of revolutions of the carriage motor 17 and a signal demodulation circuit 20 for performing predetermined signal processing such as error correction processing and demodulation processing, for the program information read by the pickup 15.

The optical disk player 10 is also provided with an audio output circuit 19 consisting of a D/A converter for converting the program information subjected to the signal processing by the signal demodulation circuit 20 into analog data, an amplifier for amplifying the program information converted into the analog data, a loudspeaker for outputting the amplified program information, and the like. A CPU 21 controls the servo control circuit 30 and the signal demodulation circuit 20.

A display section 23 displays data such as an elapsed time of playback of program information, and the track number. An operation section 22 is operated by the user to select the track number to play or to input an operation command to start and stop the playback.

In the described optical disk player 10, when the optical disk 11 is inserted through a disk slot (not shown) into the main unit of the optical disk player 10, the optical disk 11 is placed on the turntable 14.

Following a command from the CPU 21, the servo control circuit 30 controls rotating the spindle motor 13 so as to rotate the optical disk 11 at a constant linear speed.

Further, the servo control circuit 30 controls the carriage motor 17 for driving the feed screw mechanism 18 so as to place laser beam of the pickup 15 at a predetermined position in the read-in area of the optical disk 11. The TOC information read by the pickup 15 is subjected to signal processing by the signal demodulation circuit 20 and is stored in memory contained in the CPU 21.

The servo control circuit 30 also controls the carriage motor 17 for driving the feed screw mechanism 18 so as to place laser beam of the pickup 15 at the beginning position of the program information with track number TNO.1 in the data area. The pickup 15 starts to read the program information with track number TNO.1 at the beginning thereof and the read program information is output through the signal demodulation circuit 20 and the audio output circuit 19.

When the user performs track number selection operation through the operation section 22, the CPU 21 receives a signal of the selection operation and controls the servo control circuit 30 so as to place laser beam of the pickup 15 at the top position of the selected track number. The servo control circuit 30 controls the carriage motor 17 for placing laser beam of the pickup 15 at a predetermined position.

The pickup 15 reads the program information with the selected track number and the read program information is output through the signal demodulation circuit 20 and the audio output circuit 19.

If the optical disk player 10 functions as, for example, an in-car disk player installed in a vehicle, it is connected to an ACC line (accessory power line) of the vehicle and is started by a power supply voltage supplied via the ACC line from a battery of the vehicle.

In this case, the power of the optical disk player 10 is turned off when an ACC switch placed in the ACC line is turned off.

If the optical disk player 10 functions as, for example, a home disk player, it is connected to a power supply installed in a house, whereby a power supply voltage is supplied and the optical disk player 10 is started.

If the optical disk player 10 functions as, for example, a portable disk player, it is started by a power supply voltage supplied from a rechargeable battery or a dry battery in the disk player. In these cases (the case with a home disk player and a portable disk player), the power of the optical disk player 10 is turned off when a power switch placed on the optical disk player 10 is turned off.

The CPU 21 stores as a program a sequence used to determine the playback start position of the program information recorded on the optical disk 11 when the optical disk player 10 is started again after power of the optical disk player 10 was turned off.

That is, the optical disk player 10 comprises a sequence used to determine the playback start position of the program information when the optical disk player 10 is started again after the power switch was turned off while the pickup 15 is reading the program information recorded on the optical disk 11 (during the playback) or after playback is interrupted due to an unexpected accident such as a power failure or a battery exhaustion.

Next, the sequence will be discussed using a flowchart of FIG. 2. The CPU 21 senses that the ACC switch of the vehicle or the power switch placed on the optical disk player 10 is turned on, namely, the optical disk player 10 is again started (step SS), and controls the servo control circuit 30 for rotating the spindle motor 13.

Further, the CPU 21 causes the pickup 15 to read the time code (absolute address) of the playback position at which the pickup 15 was positioned when power of the optical disk player 10 was turned on and the track number TNO.m of the program information corresponding to the playback position, and stores the time code (absolute address) and the track number TNO.m in the internal memory through the signal demodulation circuit 20 (steps S1 and S2).

The CPU 21 computes record time TTm of the whole program information with the track number TNO.m, playback elapsed time LTm, and remaining record time RTm based on the absolute address and the TOC information previously recorded in the memory (step S3).

That is, the record time TTm of the whole program information is computed, for example, by subtracting the time code of playback start from the time code of playback end in the TOC information corresponding to the read track number TNO.m.

The playback elapsed time LTm is computed, for example, by subtracting the time code of playback start in the TOC information corresponding to the read track number TNO. m from the read absolute address.

The remaining record time RTm is computed, for example, by subtracting the found playback elapsed time LTm from the previously computed record time TTm of the whole program information.

Next, the CPU 21 determines whether or not the record time TTm of the whole program information with the track number TNO.m is shorter than a predetermined time (in the embodiment, for example, 60 seconds) (step S4).

If the CPU 21 determines at step S4 that the record time TTm is shorter than the predetermined time, the CPU 21 switches the process to step S5; if the CPU 21 determines that the record time TTm is equal to or longer than the predetermined time, the CPU 21 switches the process to step S6.

Figure 2:
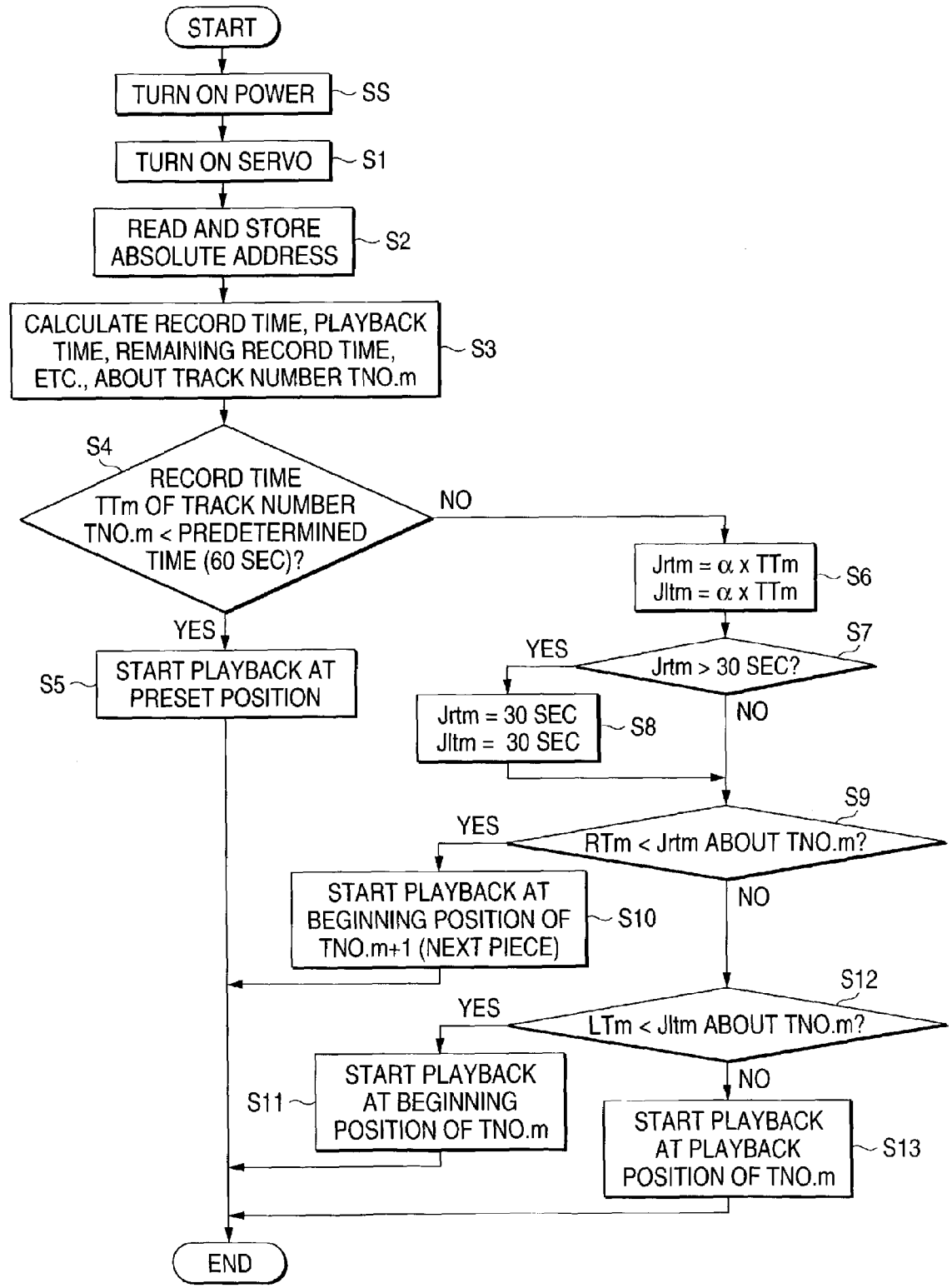
FIG. 2 is a flowchart to show an embodiment of a record medium playback method according to the invention.
Figure 3:
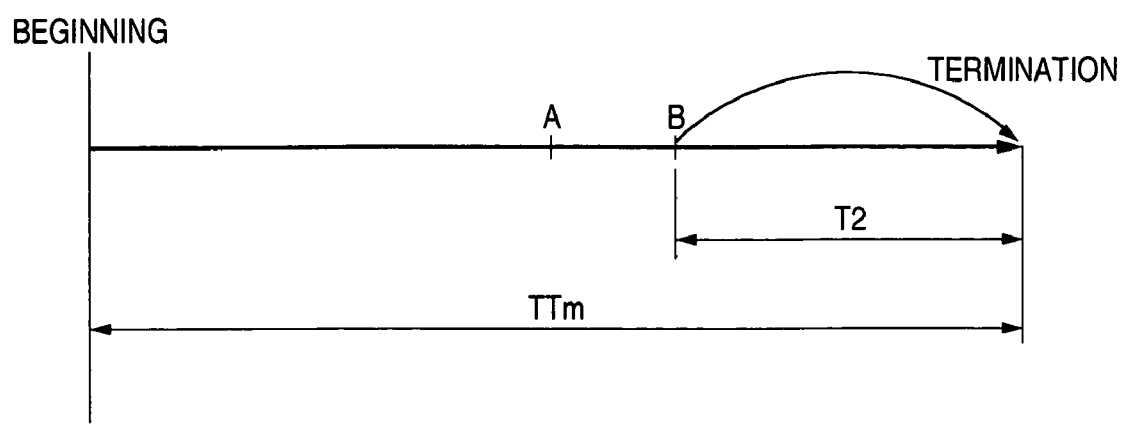
FIG. 3 is a schematic representation to show a problem involved in a record medium playback apparatus and a record medium playback method in a related art.

In the embodiment, step S5 shown in the flowchart of FIG. 2 is called first sequence and steps S6 to S13 are called second sequence.

If it is determined at step S4 that the record time TTm of the whole program information with the track number TNO.m is shorter than the predetermined time, the first sequence is executed for restarting playback at the beginning position of the program information with the track number TNO.m (step S5).

The CPU 21 controls the carriage motor 17 for moving the pickup 15 so as to place laser beam of the pickup 15 at the beginning position of the program information with the track number TNO.m.

The pickup 15 reads the program information at the beginning position thereof, whereby playing back the program information is started.

The predetermined time may be set as a fixed time in the CPU 21 or may be set as a variable time that can be set as desired by the user through the operation section 22. If the predetermined time is set as a variable time, for example, to play back a optical disk 11 recording a plurality of pieces of program information each with a comparatively short record time, it is preferable to set the predetermined time to a longer time in a variable manner, thereby playing back the program information whose playback was interrupted can be reliably started at the beginning position of the program information.

If it is determined at step S4 that the record time TTm of the whole program information with the track number TNO.m is equal to or longer than the predetermined time, the second sequence is executed. The CPU 21 finds a reference time used as the determination criterion as to whether or not playing back the program information with the track number TNO.m is to be started at the playback position at which the pickup 15 was positioned when power of the optical disk player 10 was turned off (step S6).

At step S6, the CPU 21 calculates two reference times of reference time Jrtm to be compared with the calculated playback elapsed time LTm of the program information with the track number TNO.m and reference time Jltm to be compared with the calculated remaining record time of the program information with the track number TNO.m.

The CPU 21 multiplies the record time TTm of the whole program information with the track number TNO.m found at step S3 by a predetermined coefficient α (for example, α=0.1) to find the reference time Jrtm and the reference time Jltm.

At step S6, the record time TTm of the whole program information with the track number TNO.m is multiplied by the same coefficient α to find the same time for the reference time Jrtm and the reference time Jltm.

The CPU 21 compares either of the references times with a predetermined time. In the flowchart of FIG. 2, whether or not the reference time Jrtm is longer than a predetermined time (in the embodiment, 30 seconds) is determined (step S7).

The purpose of step S7 is as follows: When the record time of the whole program information is extremely long, if it is multiplied by a predetermined coefficient to find the reference time, it is estimated that the reference time itself becomes extremely long and therefore setting the reference time not fitted for determining the playback start position is eliminated. If the CPU 21 determines at step S7 that the reference time is longer than the predetermined time, the CPU 21 sets the predetermined time as the reference time Jrtm and the reference time Jltm (step S8).

The CPU 21 compares the found reference time Jrtm with the remaining record time RTm of the track number TNO.m and determines whether or not the remaining record time RTm is shorter than the reference time Jrtm (step S9).

If the CPU 21 determines at step S9 that the remaining record time RTm is shorter than the reference time Jrtm, the CPU 21 increments the track number TNO.m and restarts playing back at the beginning position of the program information with track number TNO.m+1=track number TNO.x (step S10).

The CPU 21 controls the carriage motor 17 for moving the pickup 15 so as to place laser beam of the pickup 15 at the beginning position of the program information with the track number TNO.x.

The pickup 15 reads the program information at the beginning position thereof, whereby playing back the program information is started. If the CPU 21 determines at step S9 that the remaining record time RTm of the track number TNO.m is equal to or longer than the reference time Jrtm, the CPU 21 compares the found reference time Jltm with the playback elapsed time LTm of the track number TNO.m and determines whether or not the playback elapsed time LTm is shorter than the reference time Jltm (step S12).

If the CPU 21 determines at step S12 that the playback elapsed time LTm is shorter than the reference time Jltm, the CPU 21 restarts playing back at the beginning position of the program information with the track number TNO.m (step S1).

The CPU 21 controls the carriage motor 17 for moving the pickup 15 so as to place laser beam of the pickup 15 at the beginning position of the program information with the track number TNO.m. The pickup 15 reads the program information at the beginning position thereof, whereby playing back the program information is started. If the CPU 21 determines at step S12 that the playback elapsed time LTm of the track number TNO.m is equal to or longer than the reference time Jltm, the CPU 21 starts playing back at the playback position at which the pickup 15 was positioned when the power of the optical disk player 10 was turned off (step S13).

Then, the CPU 21 starts playing back the program information with the track number TNO.m at the playback position.

Thus, in the optical disk player 10 in the embodiment, when the optical disk player 10 is started, the playback start position is determined based on the record time of the whole program information corresponding to the playback position at which the pickup 15 was positioned when the power of the optical disk player 10 was turned off just before the starting. That is, if the program information has a comparatively short record time, the playback start position is determined the beginning position of the program information corresponding to the playback position according to the first sequence.

Thus, if it is known that the record time of the program information is short, even if playing back the same program information is repeated from the beginning, the repeated playback time is short and therefore an offensive feeling to the user is small.

If the program information has a comparatively long record time, the playback start position is determined according to the second sequence. That is, if the playback elapsed time of the program information corresponding to the playback position at which the pickup 15 was positioned when the power of the optical disk player 10 was turned off is comparatively short, the beginning position of the program information is determined the playback start position.

From the fact that the playback elapsed time is comparatively short, it is considered that playing back the program information is interrupted shortly after it is started. Thus, playing back the program information is started again at the beginning position of the program information, whereby an offensive feeling to the user is eliminated.

If the remaining record time of the program information corresponding to the playback position at which the pickup 15 was positioned when the power of the optical disk player 10 was turned off is comparatively short, the beginning position of program information next to that program information is determined the playback start position. From the fact that the remaining record time is comparatively short, it is considered that playing back the program information is interrupted when it is about to reach the termination and the user has listened to most of the program information. Thus, playing back is restarted at the beginning position of program information next to that program information, whereby an offensive feeling to the user is eliminated.

If the playback position at which the pickup 15 was positioned when the power of the optical disk player 10 was turned off is slightly leaning to the termination position from the half of the record time of the whole program information, the playback position is determined the playback start position. In doing so, restarting of playing back at the beginning position of the next program although the remaining record time is long is avoided, and an offensive feeling to the user is eliminated.

As described above in detail, in the embodiment of the invention, if the ACC switch or the power switch placed on the optical disk player 10 is turned off while program information is being played back or if playback is interrupted because of an unexpected accident such as a power failure or a battery exhaustion, the playback start position when the optical disk player 10 is started is determined using the first sequence and the second sequence. Thus, in addition to eliminating "playback with the beginning part skipped" and "playback with the last part remaining," if the remaining record time is long, the program information is played back without ignoring the remaining part of the program information, so that it is made possible to more eliminate an offensive feeling to the user.

In the embodiment, the record medium playback apparatus for playing back program information recorded on a optical disk has been described as an example, but the invention is not limited to it. For example, the invention can also be applied to a record medium playback apparatus for playing back a magneto-optical disk such as an MO disk or an MD (Mini Disk). The invention can also be applied to a record medium playback apparatus for playing back a read-only type disk such as a CD (Compact Disk) or a DVD (Digital Versatile Disk), and also be applied to a record medium playback apparatus for playing back a rewritable type disk such as CD-R, CD-RW, DVD-R, DVD-RW.

In the description of the embodiment, the two reference times of the reference time to be compared with the playback elapsed time and the reference time to be compared with the remaining record time are computed and are compared with the playback elapsed time and the remaining record time. However, only either of the reference times may be computed and compared with the corresponding record time.

The sequence of comparing the reference time with the remaining record time and then comparing the reference time with the playback elapsed time has been described, but the comparing order may be reversed. Further, in the description given above, the two reference times of the reference time to be compared with the playback elapsed time and the reference time to be compared with the remaining record time are set to the same time, but may be set to different times.

In the description given above, if the record time of the whole program information is shorter than the predetermined time, the beginning position of the program information is determined the playback start position according to the first sequence. However, the sequence may be a sequence of setting the playback start position to any other position than the beginning position of the program information, for example, the beginning position of program information next to that program information or the playback position at which the pickup was positioned when the power of the record medium playback apparatus was turned off. If the program information has a comparatively short record time, it is also possible that the user may want to skip again playing back the program information, in which case the playback start position can be set appropriately as desired.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A record medium playback apparatus for playing back a record medium recording a plurality of pieces of program information and information including record time for each of the pieces of program information, the apparatus comprising:
    a playback section adapted to play back the program information; and
    a playback control section adapted to control a playback start position of the program information when the record medium playback apparatus is restarted after power thereof was turned off, wherein the playback control section determines the playback start position of the program information using a first sequence when the record time of the whole program information corresponding to the playback position at the power off is less than a predetermined time, and determines the playback start position of the program information using a second sequence when the record time of the whole program information corresponding to the playback position at the power off is equal to or longer than the predetermined time.

2. The record medium playback apparatus as claimed in claim 1,
wherein the second sequence comprises setting reference time used as a determination criterion as to whether or not playing back the program information is to be started at the playback position at the power off, and comparing the reference time with playback elapsed time until the power off of the program information corresponding to the playback position at the power off, thereby determining the playback start position.

3. The record medium playback apparatus as claimed in claim 1,
wherein the second sequence comprises setting reference time used as a determination criterion as to whether or not playing back the program information is to be started at the playback position at the power off, and comparing the reference time with a remaining record time computed from playback elapsed time until the power off time of the program information corresponding to the playback position at the power off and the record time, thereby determining the playback start position.

4. The record medium playback apparatus as claimed in claim 1,
wherein the first sequence comprises determining that the playback start position is any of the playback position at the power off, the beginning position of the program information corresponding to the playback position at the power off, or the beginning position of program information next to the program information corresponding to the playback position at the power off.

5. A record medium playback method for playing back a record medium recording a plurality of pieces of program information and information including record time for each of the pieces of program information, the method comprising:
when a record medium playback apparatus is restarted after power thereof was turned off, comparing the record time of the whole program information corresponding to the playback position at the power off with a predetermined time;
determining a playback start position of program information using a first sequence when the record time is less than the predetermined time;
determining a playback start position of program information using a second sequence when the record time is equal to or longer than the predetermined time; and
starting playing back of the program information at the determined playback start position.

* * * * *